…

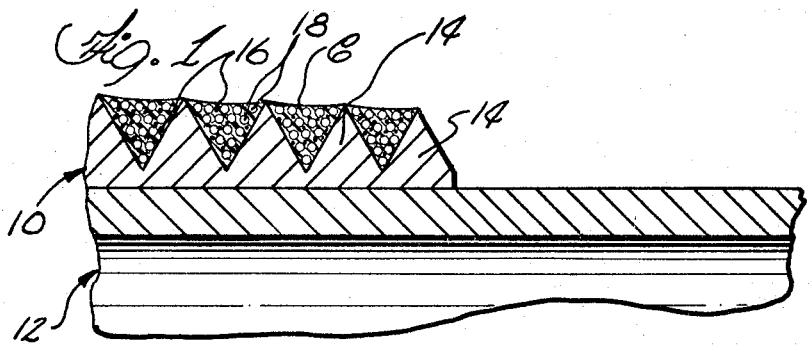
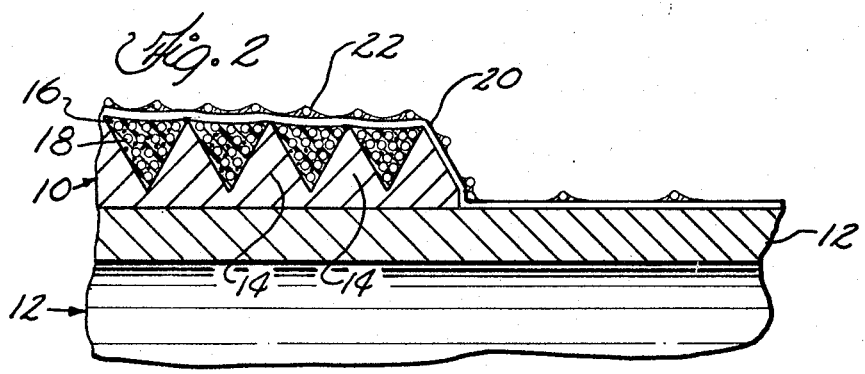
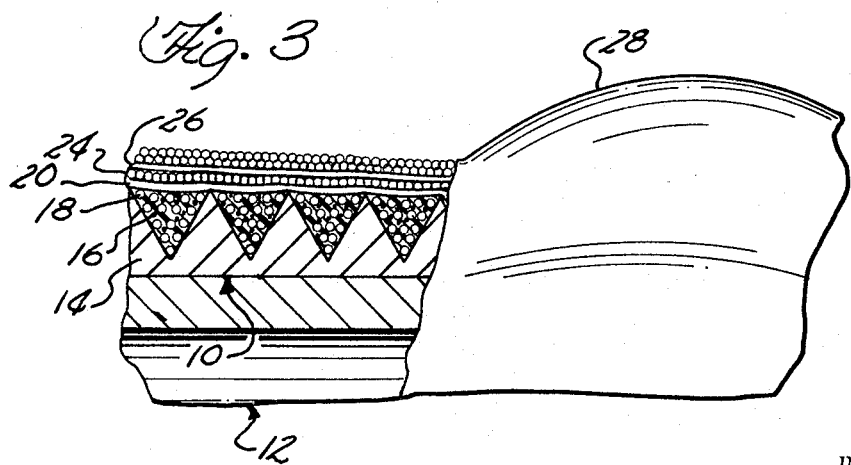

United States Patent Office 3,381,715
Patented May 7, 1968

3,381,715
GLASS-REINFORCED THREADS WITH SILICA POWDER DISPOSED THEREIN
Vesta F. Michael, Wichita, Kans., assignor to Rock Island Oil & Refining Co., Inc., Wichita, Kans., a corporation of Kansas
Filed Feb. 25, 1964, Ser. No. 347,163
2 Claims. (Cl. 138—109)

ABSTRACT OF THE DISCLOSURE

A glass-reinforced resin pipe having female threads formed therein is provided with silica powder disposed in said resin adjacent glass reinforcements. The glass reinforcements are logitudinally disposed in said pipe, under tension.

---

This invention relates to glass-reinforced resin pipe, and more particularly relates to reinforced, high-strength female threads formed thereon and to a method for forming the same.

The use of glass-reinforced plastic pipe is well known. In my copending application Ser. No. 230,093, filed Oct. 12, 1962, now Patent No. 3,291,881, a glass reinforced plastic pipe construction having opposed threaded male and female ends was disclosed together with a method for forming the threads thereon.

As set forth in my copending application Ser. No. 230,093, female threads may be internally formed on one end of a reinforced plastic pipe by employing a female thread form, such as a threaded nipple-like member, disposed on one end of a pipe form or mandrel. The pipe may then be formed about the mandrel in accordance with the teaching set forth in my copending application Ser. No. 84,069, filed Jan. 23, 1961, now Patent No. 3,202,560, by applying alternate layers of longitudinal and helical glass roving to the mandrel and embedding such roving in uncured resin, such as epoxy resin. Resin and roving are also applied to the nipple threads constituting the female thread form, simultaneously with the pipe formation. The entire assembly is then heat-cured and the integral pipe having female threads formed therein is subsequently disassembled from the forms comprising the nipple and mandrel.

It had been found that difficulty was oftentimes experienced in the course of female thread formation with low thread strength which, of course, affected the strength and workability of the pipe as a whole. In the method of female thread formation set forth in my copending application Ser. No. 230,093, uncured resin is applied to the threads of the rotating nipple and short lengths of glass roving are also applied to the inter-thread spaces. The removing is embedded in the resin disposed in the intervals between the threads of the nipple-like form, increasing the hoop strength of the ultimate threads, while simultaneously serving to release any air initially entrapped in the uncured resin disposed about the threads.

However, difficulty was experienced when the liquid, uncured resin-hardener mixture surrounding the threads flowed from the vicinity of the thread forms or nipple threads leaving the glass filament strands disposed in said form in an unsaturated condition.

As a result of the air spaces or voids which were created by the fluid of the uncured resin and hardener migrating during the mandrel and attached nipple rotation in the course of pipe formation, the resulting threads were of low strength. The low strength threads, in turn, led to early pipe failure. Such threads weakness comprise a most serious problem unless caution were taken in the course of pipe formation to assure that the female threads comprising a part of the finished pipe were completely devoid of air spaces or openings which might result in early pipe failure.

In accordance with this invention, a method of thread formation is provided whereby resin-hardener migration from the vicinity of the roving reinforcement disposed on the thread form is obviated.

It is an object of this invention, therefore, to provide an improved glass-reinforced resin pipe construction having female threads integrally formed therewith which are of superior strength and free from any air occlusion which might possibly cause early thread failure.

It is a further object of this invention to provide a method of forming a glass-reinforced plastic pipe construction wherein an additive is provided to the uncured resin-hardener combination surrounding the glass-reinforced portion of the threads. Such additive prevents interior flow of the resin-hardener composition in the course of the pipe formation, thereby assuring absence of any deleterious voids or openings in the threads.

It is another object of this invention to provide a method for forming female threads of great strength in a glass-reinforced plastic pipe construction which utilizes steps performed simultaneously with the normal formation of the main pipe body, thereby maintaining at a minimum the total time expenditure in the normal course of the pipe formation.

The above and other objects of this invention will become more apparent from the following detailed discussion when read in the light of the accompanying drawings and appended claims.

In one embodiment of this invention a female thread form, comprising a nipple-like member, is secured to one end of a mandrel about which a glass-reinforced, cured resin pipe member is to be formed. A liquid uncured plastic, which is to be utilized in the pipe formation, such as an epoxy-hardener composition, is poured into the nipple threads for female thread form for the ultimate pipe as the nipple rotates with the mandrel. Fine silica powder of a particle size of less than 200 mesh is applied to the uncured resin. The initially hot epoxy-hardener resin composition applied to the threads may comprise a mixture containing silica powder, or the resin-hardener composition and silica may be applied in separate steps.

After the application of the resin-hardener mixture and the silica is complete, the same is troweled into the threads, and loose ribbons of glass roving under slight tension are found about the resin-silica filled threads until the nipple threads are barely filled. Approximately four to six passes of the roving filaments are necessary to fill the threads of the nipple and with each pass of the fibers, each pass comprising one encompassing application, slightly increased tension is placed on the filaments by the operator. After the initial thread application, additional epoxy and hardener are applied and troweled in, after which three to five additional passes of roving filaments are applied. Subsequent to the final application of glass-reinforcement to the resin-filled threads of the form, silica powder is applied and troweled in.

The body of the pipe is then formed in a normal manner by application of a longitudinal fiber reinforcement which extends over the partially formed threads which is saturated with the epoxy-hardener composition. A spiral wrap having spaced windings is the employed to tie down the initial longitudinal reinforcement, the windings being approximately one-quarter to one-half inch apart in the vicinity of the threads.

After the latter spiral is disposed about the threads, additional epoxy-hardener composition and silica powder are worked in, after which a regularly applied spiral wrap for pipe reinforcement in directions transverse to the longitudinal axis of the ultimately formed pipe is placed about the length of the pipe and over the threads formed about the nipple.

A second longitudinal sock may then be disposed about the partially formed pipe and additional epoxy-hardener composition with silica is applied over the threads, after which spiral wraps are applied about the form threads to build up the desired hoop strength. Resin-hardener composition is applied to saturate the wraps, after which the pipe construction is finished in the normal manner in accordance with the desired strength requirements. The socks are composed of substantially abutting longitudinal roving strands which form a continuous skirt about the enveloped mandrel.

For a more complete understanding of this invention, reference will now be made to the drawing wherein:

FIG. 1 is an enlarged fragmentary, longitudinal sectional view illustrating a nipple-like member which serves as a female thread form, the threads of which are partially filled with a rein-hardener mixture, in addition to a glass roving reinforcement and silica powder in the initial stage of thread formation.

FIG. 2 illustrates the partially formed threads of FIG. 1 in which two additional process steps have been formed, namely, the application of a longitudinal glass reinforcement about which is disposed spaced spirals of a glass hold-down layer; and FIG. 3 is an enlarged, fragmentary, longitudinal sectional view similar to the views of FIGS. 1 and 2 of completed female thread formation showing the additional application of lonigtudinal and spiral glass reinforcement layers.

Referring now to FIG. 1, an enlarged fragment of a female thread form 10 comprising a nipple-like construction is illustrated secured by a set screw or the like (not illustrated) in immovable relationship about a rotatable mandrel 12. Inasmuch as this invention is concerned solely with the specific reinforcement of female thread members, no detailed description will be presented relative to the formation of the pipe body. A description of a threaded pipe construction of the type hereinafter described having male and female threads integrally formed therewith is set forth in my copending application Ser. No. 230,093.

As above indicated, it is the function of the male threads 14 of the member 10 to serve as forms for female threads to be integrally formed within the interior of one end limit of a glass-reinforced cured resin pipe construction. It has been found that untwisted glass roving alternately arranged in longitudinal sock and spiral wrap configuration and embedded in a cured resin, such as epoxy resin cured with a hardener such as triethylene tetramine, provides a pipe construction possessing excellent strength characteristics. The specific number of glass roving layers is optional with the manufacturer. The number of longitudinal layers or transverse spiral layers disposed about the mandrel will vary in accordance with the type of service in which the completed pipe will be employed.

Prior to the formation of any part of the main pipe body, the intervals between the threads 14 of the form 10 of FIG. 1 are coated with a parting agent, such as well-known mold release compositions. The parting agent facilitates unthreading of the nipple-like member from the completed pipe after the same is formed. The coated threads then are filled with a liquid, uncured epoxy-hardener composition which is troweled into the threads so that they are filled and free of air entrapment. It should be understood that although the description hereinafter presented is specific to epoxy resin, it is quite obvious that other resins may be employed in accordance with the process steps set forth.

After the intervals between the threads 14 have been filled with the resin-hardener mixture, silica powder is applied to the rotating thread form and the liquid epoxy-hardener composition disposed in the threads. The silica particle size is preferably less than 200 mesh, and it is desirable that the amount of silica powder applied to the resin provide a composition in which the silica is present in the amount of about thirty percent by weight.

After the silica powder, which is identified in the drawings by the reference numeral 16, has been applied to the uncured resin, the same is troweled into the threads to obtain a maximum amount of admixture with the resin, after which short lengths of glass roving 18 are spread in ribbon form and applied in such spread form into the resin-filled intervals between the threads 14 of the form 10. The spread roving 18, after one encompassing application, then has applied thereover a pure epoxy-hardener coating, which is troweled over the surface.

Following the latter resin-hardener application, the operator applies between three to five additional passes of roving filaments, each pass of filaments being under increased tension. At the end of the last filament pass in spread ribbon form, the intervals between the threads 14 of the form 10 are substantially filled. Following application of the final filament pass, the minus 200 mesh silica powder is again applied and troweled into the inter-thread intervals of the form.

The silica particles are of irregular surface configuration having jagged projections. The latter projections serve as anchors tending to prevent flow of the uncured resin-hardener composition from the vicinity of the male threads of the form 10. The silica thus "anchors" the liquid, uncured resin to the glass filaments, preventing resin flow and assuring the absence of voids in the threads.

It is preferable that the nipple threads at this stage appear substantially as indicated in FIG. 1 with a slight concavity C defining the surface of the inter-thread interval. After the threads have been filled so as to have the structure substantially as illustrated in FIG. 1, a longitudinal roving sock which will afford tensile strength for the completed pipe member is applied under tension over the rotating pipe body and locked in place so as to be rotatable with the mandrel and attached thread form 10. One end of the longitudinal sock will extend over the thread form 10 and the partially formed resin threads being formed thereover, as illustrated in FIG. 1.

The glass filaments applied under increased tension are initially attached to the rotating, resin-filled intervals of the threads of form 10 by the viscous nature of the resin-hardener liquid. The form rotation thus serves to pull the threads from the operator or source apparatus after the initial attachment has been effected.

A longitudinal sock 20 is illustrated in FIG. 2 disposed about the partially formed reinforced resin threads being built up about the thread form 10. The longitudinal sock 20 is tied at its center (not illustrated) so as to minimize deformation thereof by centrifugal forces, and a spiral wrap 22 having as its main function the retention of the sock to the mandrel surface is then applied to the mandrel over the longitudinal sock 20 along the length of the pipe. The spiral hold-down layer when applied over the thread form 10 is preferably applied in close spirals, approximately one-quarter to one-half inch apart.

Prior to application of the hold-down spiral, the longitudinal sock is saturated with epoxy resin so as to assure a solid, void-free construction and to minimize the possibility of any air entrapment. Accordingly, after a hold-down spiral, such as spiral 22 (see FIG. 2) is applied to the longitudinal sock 20 over the thread form 10, the saturated longitudinal sock portion disposed over the thread form 10 is again saturated with an epoxy-hardener composition to which silica is applied and worked in. The pipe construction at this stage will be substantially as illustrated in FIG. 2.

At this stage of pipe formation, a spiral wrap of glass roving is applied along the length of the pipe, the wrap also extending over the form 10. Spiral wrap 24 pulls longitudinal sock 20 into intimate engagement with the concave surfaces of the partially formed threads and the entire assemblage is ultimately cured into a solid void-free integral member. The sock 20 imparts to the threads shear strength or reinforcement opposing thread movement relative to the pipe wall with which formed, parallel to the longitudinal axis of the pipe. Following the application of the overlapping spiral wrap, such as wrap 24 of FIG. 3, a second longitudinal sock, such as sock 26, for imparting additional tensile strength to the ultimately formed pipe is applied over the spiral wrap. The second longitudinal sock is tied down in the center in the manner of the first longitudinal sock 20 and is also saturated with the epoxy-hardener composition. Once again the glass-reinforcement disposed about the pipe form 10 is saturated with epoxy-hardener composition, and silica powder of less than 200 mesh is applied and worked in.

Following the latter silica application, additional spiral wraps of glass roving are applied until the desired hoop strength of the threads has been formed, adequate resin being applied in the course of the latter spiral operation to insure complete saturation of the spiral reinforcements.

The final application of glass reinforcement is in the form of a spiral wrap which serves to lock strands in place on the exterior surface of the pipe. It will be noted from FIG. 3 that a build-up 28 is formed in the vicinity of the form threads, the function of which is to serve as a large reinforced area to which wrenches or other tools may be applied in the course of handling the pipe.

It is seen from the foregoing description that a method has been provided for forming glass-reinforced resin threads on the interior of a pipe member, which threads are substantially assured of no air entrapment in the course of formation. The manufacture of a solid, void-free reinforced cured resin thread is assured by the expedient of applying fine silica powder placed on the glass reinforcements in the uncured resin applied to the thread-formed intervals in the initial stages of thread formation.

The minute silica particles serve as resin anchors retaining the uncured liquid hardener-resin composition in place in the vicinity of the glass filament reinforcements disposed in the threads of the form. As a result of the anchor-like function which the silica particles serve, escape of the liquid resin-hardener composition or flow thereof from the innermost portions of the threads is substantially completely avoided in the normal course of thread build-up. Since a solid thread free of voids is assured utilizing the method steps above-described, high desired thread strength is assured, thereby also assuring a pipe having good overall strength.

Obvious changes may be made in the invention described. The particular roving or other glass reinforcement employed in the threads is not of great importance. The number of filaments in each roving strand is not significant; accordingly, the number of passes to substantially fill the inter-thread intervals of the form 10 may vary from the number above indicated.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:
1. A glass-reinforced, cured resin pipe construction having female threads formed integrally therewith at one end limit, said female threads comprising cured resin having disposed therein silica powder, the pipe wall portion with which said female threads are formed having longitudinal glass filamentous reinforcements under tension disposed adjacent said threads whereby the shear strength thereof is improved.

2. A glass-reinforced, cured resin pipe construction having female threads formed integrally therewith at one end limit, said female threads having glass filamentous reinforcements disposed therein under tension and arranged substantially transversely to the longitudinal axis of the pipe of which comprising a part; said female threads also having disposed therein silica powder adjacent said transversely disposed glass filaments; the pipe wall portion with which said female threads are formed having longitudinal glass filamentous reinforcements under tension disposed adjacent said threads whereby the shear strength thereof is improved; said silica powder and said glass filaments being embedded in a cured resin.

References Cited

UNITED STATES PATENTS

| | | | |
|---|---|---|---|
| 2,943,967 | 7/1960 | Simon | 285—390 |
| 2,977,268 | 3/1961 | Randolph | 264—257 |
| 3,028,284 | 4/1962 | Reeves | 264—257 |
| 2,669,469 | 2/1954 | Finch | 285—390 |
| 2,925,097 | 2/1960 | Duesterberg | 285—390 |
| 2,847,786 | 3/1958 | Hartley. | |
| 2,878,038 | 3/1959 | Noland | 285—284 |

OTHER REFERENCES

Oleesky, S. W., and Mohr, G. J.: Handbook of Reinforced Plastics, Reinhold, Jan. 2, 1964, pp. 297 and 548.

Lee H., and Neville, K.: Epoxy Resins, McGraw-Hill Book Company, Inc., 1957, pp. 146–153 and pp. 225–227.

EDWARD C. ALLEN, *Primary Examiner.*

CARL W. TOMLIN, *Examiner.*

DAVE W. AROLA, *Assistant Examiner.*